United States Patent
Pooni et al.

(10) Patent No.: US 7,610,295 B2
(45) Date of Patent: Oct. 27, 2009

(54) METHOD AND APPARATUS FOR GENERATING PERSISTENT PATH IDENTIFIERS

(75) Inventors: Subramaniyam Pooni, Ventura, CA (US); Vijay Srinath, Bangalore (IN); Vikram Krishnamurthy, Bangalore (IN); Rajkumar Mangalore, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1761 days.

(21) Appl. No.: 10/260,411

(22) Filed: Oct. 1, 2002

(65) Prior Publication Data
US 2004/0064459 A1    Apr. 1, 2004

(51) Int. Cl.
*G06F 17/30* (2006.01)

(52) U.S. Cl. .......................... 707/101; 707/1; 707/102; 707/200

(58) Field of Classification Search ................. 707/1–4, 707/100–102, 200, 205, 10, 203; 709/203; 719/321, 326, 327; 710/1, 38, 73, 74, 316
See application file for complete search history.

(56) References Cited

U.S. PATENT DOCUMENTS

| 7,069,354 B2 * | 6/2006 | Pooni et al. ................. 710/316 |
| 7,165,258 B1 * | 1/2007 | Kuik et al. .................. 719/326 |
| 2003/0145041 A1 * | 7/2003 | Dunham et al. ............. 709/203 |
| 2003/0177168 A1 * | 9/2003 | Heitman et al. ............. 709/201 |

* cited by examiner

*Primary Examiner*—Mohammad Ali
*Assistant Examiner*—Marc R Filipczyk

(57) ABSTRACT

The method and apparatus is utilized in order to generate a persistent path to a SCSI device for a host. In an embodiment, a SCSI device is queried for path information related thereto, and if path information is returned, a SCSI command requesting identifier data is issued to the SCSI device. The identifier data is used to determine a unique identifier (UID), from which is generated a UID-based device file for the SCSI device that is independent from the path information.

39 Claims, 3 Drawing Sheets

Fig. 1
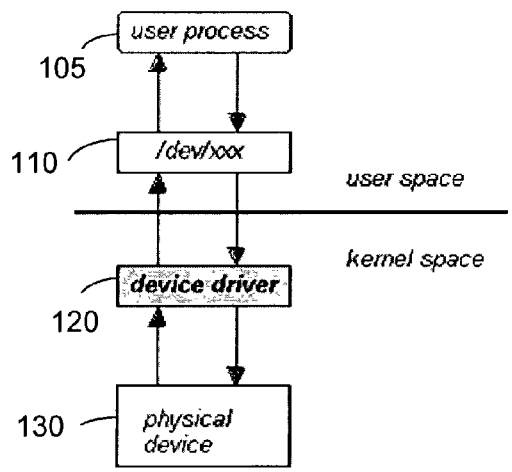
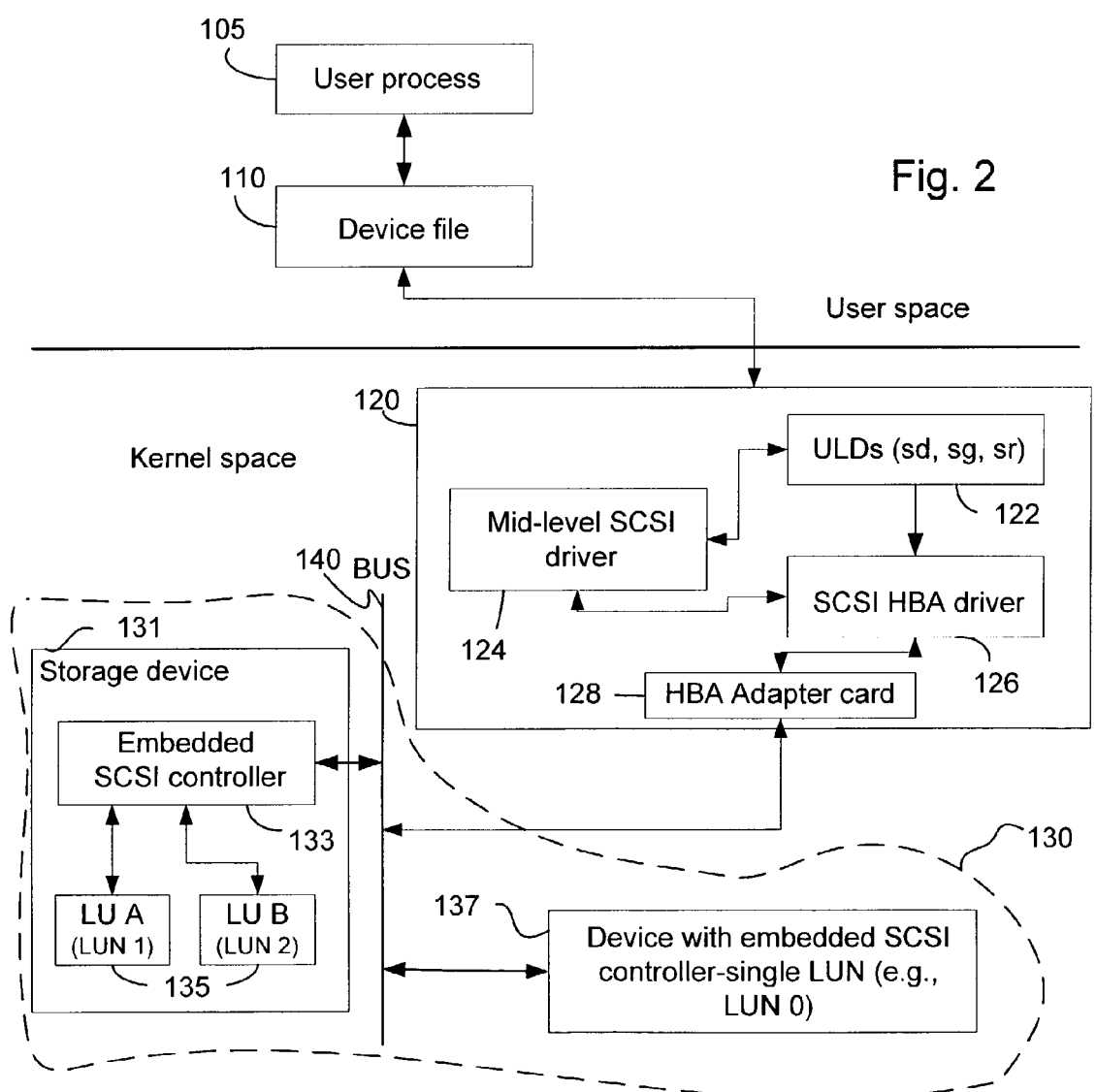
Fig. 2

US 7,610,295 B2

METHOD AND APPARATUS FOR GENERATING PERSISTENT PATH IDENTIFIERS

BACKGROUND

In a Linux or UNIX operating system (OS) everything that accepts or sends data to or from the OS is considered to be a device. Common devices include terminals, hard disks, printers, CD-ROMs, and modems. A rule of thumb is that anything used for input, storage, or handling of data in an OS is considered a device and needs what is called a "device entry" so that it may be detected by the OS.

Each of these devices may also be SCSI devices. SCSI (small computer system interface) is a family of standards that connects components via a parallel bus for system-level interfacing between a computer and intelligent devices such as hard disks, floppy disks, CD-ROMs, printers, scanners and other types of media devices or storage devices. SCSI can connect multiple devices to a single adaptor (e.g., a host bus adapter (HBA) or port) on a SCSI bus. SCSI devices transfer bits in parallel and can operate in either asynchronous or synchronous modes.

All devices communicate in one of two ways; either one character at a time, or as a complete set of data in a predefined block. Therefore, devices can be classified as being either "character mode" or "block mode". Terminals, printers, and modems are character devices since they handle data one character at a time. Hard drives and tape drives use blocks to transmit data as large chunks of information so they are block mode devices. Some devices function in either mode using two different device drivers.

A device driver is a software module that is part of the kernel and that supports access to a peripheral device. A device driver is a collection of subroutines and data within a kernel (a kernel is the core software of an OS) that constitutes the software interface to an I/O device. In Linux, when a device needs to be accessed the Linux kernel passes an I/O request to the device driver, which handles the communication with the device. Special device files (hereafter "device files") are used to access devices which are connected to a Linux system, devices such as printers, tape drives, terminals and disk drives used for file system storage. Device files are kept in what is called a /dev directory and are given device file names representative of their function, such as "/dev/fd0" for a floppy drive, for example. A device file may be type c (for "character" devices, devices that do not use a buffer cache) or type b (for "block" devices, which go through a buffer cache). In Linux, all disks are represented as block devices only.

FIG. 1 illustrates a general interaction of device files within a UNIX or Linux subsystem. In FIG. 1, a user process 100 makes a request to the kernel (e.g., in kernel space) using typical file-related system calls and special device files 110 (device files) normally found in the /dev directory. Actually the device files 110 are the user-visible portion of a device driver interface. Each device file 110 refers to a specific device driver 120, which is invoked by the kernel in order to perform the requested operation on the physical device 130 (e.g., hardware component).

Devices are identified by a device number. Device numbers allow the operating system to differentiate between the devices. Each device is assigned a major and minor number. The major number identifies the type of the device (e.g., the device driver) while the minor number represents an instance of a device of the type specified by the major device number. The major number in Linux is a number ranging from 0 to 255 that identifies the device type. The minor number is also a number ranging from 0 to 255 that specifies a specific device from a group of devices that share the major number. SCSI devices, device drivers and device numbers having been briefly introduced, a discussion of the Linux SCSI I/O Subsystem is provided in order to further describe a background context for the invention.

Linux SCSI I/O Subsystem

The Linux SCSI I/O subsystem is made up of two basic elements, each of which may be represented by data structures. The first basic element is a SCSI host. A SCSI host is a physical piece of hardware, such as a SCSI controller or HBA. If a system has more than one SCSI controller of the same type, each instance will be represented by a separate SCSI host. This means that a SCSI device driver may control more than one instance of its controller. SCSI hosts are almost always the "initiator" of SCSI commands, thus a SCSI host may be termed a SCSI initiator device, with the host controller or HBA being an "initiator". A scsi_host data structure is used to describe each instance of a host adapter (HBA) on the system.

The second basic element within the Linux SCSI I/O subsystem is a device. As discussed above, there are several types of SCSI devices: disk, tape, CD-ROM and generic SCSI devices. The different disk types have different major device numbers allowing Linux to direct block device requests to the appropriate SCSI type. A scsi_device data structure is used to describe a single SCSI device. There will be a single instance of the structure allocated for each physical device that is detected. Any device (such as a CD changer) that responds to multiple LUNs (logical unit numbers, a type of identifier discussed further below) is treated as separate instances of independent devices. The scsi_host and scsi_device data structures, which are objects, are allocated at the time the SCSI bus is scanned, for example when the Linux OS is re-booted. Objects, as are known in the computer literature, represent architectural abstractions or containers that encapsulate data types, data structures, services or other objects that are related in some way.

FIG. 2 illustrates the relationship between device files, drivers and devices in a Linux SCSI I/O Subsystem. FIG. 2 is a more detailed block diagram of FIG. 1, in order to illustrate the driver architecture and connection to physical devices in the Linux SCSI I/O subsystem (hereinafter SCSI subsystem). In FIG. 2, user process 105 opens a special device file 110 (device file) in order to communicate with physical devices 130 via their device drivers 120. The SCSI subsystem has a three (3) level driver architecture with the "upper" level layer (e.g., upper level drivers (ULDs)122) being closest to a user space/kernel space interface, while the "lower" level layer (e.g., SCSI HBA drivers 126) being closest to hardware (e.g., physical devices 130). As will be explained further below, ULDs 122 are commonly known by a terse two letter abbreviation (e.g. "sd" for SCSI disk driver).

The ULDs 122 maintain the kernel side of the Linux OS's user-kernel interface for the logical class of devices they represent (e.g. disks). They are also responsible for managing certain kernel and SCSI subsystem resources such as kernel memory and SCSI command structures. Applications in the user space (e.g., user process 105) access these ULDs by opening the special device file 110 (block or char type device file) typically found in the /dev directory tree.

Accordingly, the ULDs 122 (e.g., upper level layer) support the kernel/user interface. For example, in the case of sd (disk) and sr (CD-ROM) drivers, the kernel/user interface is a block device interface, while for st (tape) and sg (generic) drivers, the kernel/user interface is a character device interface. Any operation using the SCSI subsystem (e.g. reading a sector from a disk) involves one driver at each of the 3 levels, e.g. sd drivers (122), SCSI mid-level driver (124) at a mid level SCSI layer, and a SCSI HBA driver 126 of a lower level layer.

The mid-level SCSI driver 124 is common to all operations. The mid-level SCSI driver 124 defines internal interfaces and provides common services to the upper and lower level drivers. IOCTLs (input/output control commands) provided by the mid-level SCSI driver 124 are available to file descriptors belonging to any of the four (sd, sr, st, sg) ULDs 122.

The most common operation on a block device is to "mount" a file system. For an sd device, typically only a partition is mounted (e.g. mount-t ext2/dev/sda6/home). For an sr device, usually the whole device is mounted (e.g. mount-t iso9660/dev/sr0/mnt/cdrom).

Sd is a member of the generic disk family, as is the hd device from the IDE (Integrated Device Electronics, a well-known mass storage device interface standard) subsystem. Apart from mounting sd devices, an fdisk command is available to view or modify a disk's partition table. Sr is a member of the CD-ROM subsystem. Apart from mounting file systems (e.g. iso9660), audio CDs can also be read. The latter action does not involve mounting a file system, but typically involves invoking some IOCTLs. St is a char (character) device for reading and writing tapes. Sg is a SCSI command pass through device that uses a char device interface.

When device drivers 120 are called, e.g., by an IOCTL call for example, the user process 105 is attempting to communicate with one or more devices 130, As discussed above, device drivers 120 provide a gateway for communicating with the device 130. A device driver 120 is a collection of subroutines and data within the kernel that constitutes the software interface to the device 130. Device drivers 120 are connected, via an HBA adaptor card 128, to a SCSI bus 140. In FIG. 2, physical devices (storage device 131 and device 137) are also connected to SCSI bus 140, via an associated SCSI controller (e.g., HBA). Device 137 is a device that has a single logical unit number LUN (e.g., LUN 0). LUNs are described in further detail below. Storage device 131 illustrates a device with an embedded SCSI controller 133 and multiple LUNs 135, e.g., LUN 1 for a logical unit A (LU A) and LUN 2 for a logical unit B (LU B).

SCSI Addressing.

Linux has a four-level hierarchical addressing scheme for SCSI devices: (a) SCSI adapter number [host]; (b) channel number [bus]; (c) ID number [target]; and (d) LUN [lun]. The term "LUN" is a common SCSI abbreviation of Logical Unit Number. The LUN identifies the logical unit within a SCSI target device. A SCSI target device is a SCSI device containing logical units (LUs) that service commands from a SCSI initiator device. As is known, a logical unit may be defined as addressable blocks of storage created from one or more disks contained within a SCSI device. A logical unit may provide a unique connection to an application program or another SCSI device. The term "Bus" is used herein in preference to "channel number" for the description below.

The SCSI adapter number is typically an arbitrary numbering of adapter cards on internal I/O SCSI buses (e.g. PCI, ISA etc) of a computer (Linux host) running the Linux OS. Such adapters are commonly referred to as SCSI controllers or host bus adapters (HBAs). Adapter numbers are issued by the Linux kernel in ascending order, starting with 0. Each HBA may control one or more SCSI buses.

Each SCSI bus can have multiple SCSI devices connected to it. In SCSI parlance, the HBA may be called the "initiator" (e.g., it may be an HBA of a SCSI initiator device) and takes up one SCSI ID number (typically the number "7"). The initiator talks to targets, commonly also known as SCSI target devices (e.g. disks), as briefly discussed above.

On SCSI parallel buses, the number of SCSI IDs are related to the width of the bus. For example, 8-bit buses (sometimes called "narrow" SCSI buses) may have 8 SCSI IDs, of which one ID is taken by the HBA, leaving 7 IDs for SCSI devices. Wide SCSI buses are 16 bits wide and can have a maximum of 15 SCSI devices (e.g., targets) attached. The SCSI-3 draft standard allows a large number of IDs to be present on a SCSI bus, with each SCSI device adapted to contain multiple (LUNs). These multiple LUNs are typically used by sophisticated tape and CD-ROM units that support multiple media. Accordingly, Linux's flavor of SCSI addressing is a four level hierarchy: <scsi(_adapter_number), channel, id, lun>, which is most commonly known and denoted with <host, bus, target, lun> encoding, i.e., (h0b0t0l0). Thus, a path from a SCSI host to a SCSI device (e.g., a logical unit) can be determined by the <host, bus, target, lun> or (h, b, t, l) address of the logical unit.

Storage area networking is predicated on the replacement of parallel SCSI transport with networked storage SCSI devices and tape SCSI devices behind the server or Linux Host. The vast majority of storage area networks (SANs) use a Fibre Channel (FC) medium for the underlying network transport and, at the upper layer, move data to and from disks with serial SCSI protocol, as described in the current draft SCSI Primary Commands-3 (SPC-3) document. The latest version of the SPC-3 document, found at ftp://ftp.t10.org/t10/drafts/spc3/spc3r09.pdf, provides SCSI primary command standards that are designed to be used industry wide. The combination of a high-speed transport (FC) with native SCSI protocol results in an efficient means to deploy servers, disk arrays, and tape subsystems and frees all components from the constraints of parallel SCSI architecture.

The SCSI-3 device driver supplied by the HBA vendor is responsible for mapping FC storage resources to the bus, target, lun conventions required by Linux. Since FC addresses are self-configuring, the mapping between port addresses, (which may change) and the upper level SCSI device driver designations are maintained by the HBA and the HBA's device driver interface to Linux.

The driver architecture of the SCSI subsystem and SCSI addressing having been described, the structure of device file names is now explained. A device file name can be thought of as gateway to a Linux kernel driver (e.g., upper level driver or ULD) that controls a SCSI device, rather than the SCSI device itself. Hence, there can be multiple device file names, some of which may offer slightly different characteristics, all mapping to the same actual device.

The device file names of the various SCSI devices may be found within the /dev directory. Traditionally in Linux, SCSI devices have been identified by their major and minor device number, rather than by their SCSI bus addresses (e.g. SCSI target ID and LUN). Eight block major numbers are reserved for SCSI disks: 8, 65, 66, 67, 68, 69, 70 and 71. Each major number can accommodate 256 minor numbers which, in the case of SCSI disks, are subdivided as follows in the following Table 1:

TABLE 1

Device Names for SCSI Disk Devices (sd) - Major No. 8

| | |
|---|---|
| [b, 8, 0] | /dev/sda |
| [b, 8, 1] | /dev/sda1 |
| ... | |
| [b, 8, 15] | /dev/sda15 |
| [b, 8, 16] | /dev/sdb |
| [b, 8, 17] | /dev/sdb1 |
| ... | |
| [b, 8, 255] | /dev/sdp15 |

In Table 1, the disk device file names without a trailing digit refer to the whole disk (e.g./dev/sda) while those with a trailing digit (e.g./dev/sda15) refer to one of the 15 allowable partitions within that disk. Linux supports up to 15 partitions per virtual whole disk, so the minor number serves to distinguish partitions from each other and also from other disks.

Table 2 illustrates naming conventions for the remaining seven SCSI disk block major numbers. The remaining 7 SCSI disk block major numbers (e.g., 65, 66, 67, 68, 69, 70 and 71 follow a similar pattern:

TABLE 2

SCSI Disk Devices (sd) Names - Remaining Major Nos.

| | |
|---|---|
| [b, 65, 0] | /dev/sdq |
| [b, 65, 1] | /dev/sdq1 |
| ... | |
| [b, 65, 159] | /dev/sdz15 |
| [b, 65, 160] | /dev/sdaa |
| [b, 65, 161] | /dev/sdaa1 |
| ... | |
| [b, 65, 255] | /dev/sdaf15 |
| [b, 66, 0] | /dev/sdag |
| [b, 66, 1] | /dev/sdag1 |
| ... | |
| [b, 66, 255] | /dev/sdav15 |
| ... | |
| [b, 71, 255] | /dev/sddx15 |

Accordingly, based on Tables 1 and 2, there are 128 possible disks that are allowed in Linux (i.e./dev/sda to /dev/sddx), each having up to 15 partitions.

SCSI CD-ROM devices are allocated the block major number of 11. Traditionally "sr" has been the device name, but "scd" probably is more recognizable and is favored by several recent distributions. As shown in Table 3, in Linux, 256 SCSI CD-ROM devices are allowed:

TABLE 3

Device Names for SCSI CDROM Devices (scd/sr)

| | | |
|---|---|---|
| [b, 11, 0] | /dev/scd0 | [or/dev/sr0] |
| [b, 11, 255] | /dev/scd255 | [or/dev/sr255] |

SCSI tape devices (st) are allocated the char major number of 9. Up to 32 tape devices are supported in Linux, each of which can be accessed in one of four modes (0, 1, 2 and 3), with or without rewind. Device file names for the st devices may be allocated as described in Table 4:

TABLE 4

Device Names for SCSI Tape Devices (st)

| | | |
|---|---|---|
| [c, 9, 0] | /dev/st0 | [tape 0, mode 0, rewind] |
| [c, 9, 1] | /dev/st1 | [tape 1, mode 0, rewind] |
| ... | | |
| [c, 9, 31] | /dev/st31 | [tape 31, mode 0, rewind] |
| [c, 9, 32] | /dev/st01 | [tape 0, mode 1, rewind] |
| ... | | |
| [c, 9, 63] | /dev/st311 | [tape 31, mode 1, rewind] |
| [c, 9, 64] | /dev/st0m | [tape 0, mode 2, rewind] |
| ... | | |
| [c, 9, 96] | /dev/st0a | [tape 0, mode 3, rewind] |
| ... | | |
| [c, 9, 127] | /dev/st31a | [tape 31, mode 3, rewind] |
| [c, 9, 128] | /dev/nst0 | [tape 0, mode 0, no rewind] |
| ... | | |
| [c, 9, 160] | /dev/nst01 | [tape 0, mode 1, no rewind] |
| ... | | |
| [c, 9, 192] | /dev/nst0m | [tape 0, mode 2, no rewind] |
| ... | | |
| [c, 9, 224] | /dev/nst0a | [tape 0, mode 3, no rewind] |
| ... | | |
| [c, 9, 255] | /dev/nst31a | [tape 31, mode 3, no rewind] |

The SCSI generic (sg) devices are allocated the char major number of 21. As shown in Table 5, there are 256 possible SCSI generic (sg) devices:

TABLE 5

Device Names for SCSI Generic Devices (sg)

| | |
|---|---|
| [c, 21, 0] | /dev/sg0 |
| [c, 21, 1] | /dev/sg1 |
| ... | |
| [c, 21, 255] | /dev/sg255 |

The SCSI generic device file name's use of a trailing letter (e.g. /dev/sgc) is deprecated. Each SCSI disk (but not each partition), each SCSI CD-ROM and each SCSI tape is always mapped to an sg device. SCSI devices that don't fit into these three categories (e.g. scanners) also appear as sg devices.

In Linux, device file names are dynamically mapped to SCSI id/LUNs on a SCSI bus (wherein LUN indicates a logical unit). The mapping allocates devices consecutively (e.g., in numbered order) for each LUN of each device on each SCSI bus found at time of a SCSI scan, e.g., a SCSI bus scan is performed when Linux is rebooted, such as when a device is to be added to a Linux host), beginning with the lower SCSI id/LUNs (highest priority). The map starts with the first SCSI controller (HBA) and continues without interruption with all following controllers.

For example, assuming that three SCSI devices were connected, having ids 1, 3, and 5 on the first SCSI bus (assuming each device has a single LUN), then the following mapping would be in effect:

/dev/sga→SCSI id 1
/dev/sgb→SCSI id 3
/dev/sgc→SCSI id 5

If a new device with id 4 is to be added, then the mapping (after the next rescan (reboot of Linux OS)) will be:

/dev/sga→SCSI id 1
/dev/sgb→SCSI id 3
/dev/sgc→SCSI id 4
/dev/sgd→SCSI id 5

Notice the change for id 5 as id 4 is added—the corresponding device is no longer mapped to /dev/sgc but is now mapped to /dev/sgd. The reason for this is as follows. Due to constraints imposed by Linux's use of a sixteen bit device file name, with only eight bits allocated to the minor number, SCSI disk, SCSI tape, SCSI CD-ROM, and SCSI generic minor device numbers are assigned dynamically. If a new device is added, as shown above, the minor numbers of the devices could change after the reboot, which could effectively prevent mounting of a device on the system.

The standard disk driver "sd" is used to illustrate an example of file corruption. Each SCSI disk (sd) in the system is represented by a scsi_disk data structure. These are kept in a vector array called rscsi_disks that is indexed using part of the SCSI disk partition's minor device number. So the device name dev/sdb1 has a major number of 8 and a minor number of 17 (see Table 1); this generates an index in the vector array of 1.

A scsi_device data structure is a data structure that is used to describe a single SCSI device. There will be a single instance of the structure allocated for each physical SCSI device that is detected. Each scsi_device_structure contains a SCSI device pointer (SDP) to the scsi_device data structure representing this device. That in turn points at the scsi_host data structure which "owns" the SDP.

Further, information related to a type of SCSI device (ULDs sd, st, sr, sg) are maintained in a scsi_device_template data structure. This structure, among other things, contains pointers to the detect( ), init( ), attach( ), finish( ) and detach( ) functions, which are driver routines performed by ULDs. The mid-level SCI layer in a SCSI subsystem uses these scsi_device_templates to call various the various SCSI type routines (e.g., detect( ), init( ), finish( ), attach( ), detach( ) routines, etc.) for each type of SCSI device.

The scsi_device_template is used to describe a single type of ULD. In the current implementation of the SCSI subsystem, there is an absolute maximum of four (4) instances of this structure on any given system; one for disks (sd driver), one for CD-ROMs (sr driver), one for tapes (st driver), and one for the generic pass-through devices (sg driver). If other driver types are added (e.g. scanner), a new scsi_device_template is created. A single physical SCSI device can be attached to more than one scsi_device_template (usually this is a generic driver, plus another device driver (e.g., an sd, sr, st driver).

Kernel memory is allocated for the vector rscsi_disks array during an "init" phase when the mid-level scsi layer calls a routine sd_init( ). The size of the array is fixed at the number of devices noticed during boot time. The devices noticed during boot time is computed by incrementing a device_noticed field of the sd_template data structure (e.g., whenever an sd_detect( ) routine is called from the mid_level scsi layer with a device the disk driver is aware of) plus a small limited number of spare entries for new devices.

When an sd_attach( ) routine is called from the mid-level scsi layer, the routine hands over a SDP for every SCSI device discovered. The SDPs are added by the disk driver into the vector rscsi_disks array. However, the location in the vector array where an SDP for a device is to be inserted is more dependant on the order in which the devices were discovered. In other words, and as shown above, the location depends on the SCSI id of the target, with lower valued SCSI id numbers (e.g., id 4) having priority over higher numbers (id 5).

Thus, if a new device is added, the minor numbers of the device could change. This can present a problem, because in Linux or UNIX the /etc/fstab file might contain instructions for mounting specific partitions; The file /etc/fstab is a file that includes information indicating where devices are usually mounted and the types of devices. The etc/fstab is only read by programs, and not written; thus is the duty of the system administrator to properly create and maintain this file. These partitions will be unable to be mounted since the disk appears with a different minor number. This is a problem with the current Linux SCSI subsystem.

Further, and for automatic mounting of file systems or partitions of file systems to work properly, e.g., many device files are added to the fstab file initially so that the corresponding file systems/partitions for those device files are automatically mounted as startup or boot-up of the OS, a device that is mapped to a specific controller (e.g., host bus adapter), bus, target, and LUN or (h, b, t, l) on a host must map to the same controller, bus, target, and LUN after the host is rebooted. Due to the current limitations in the Linux SCSI subsystem, there is no guarantee that the controller, bus, target, and LUN for a device will remain the same after a reboot. Because of this limitation, a device file which represented LUN-X before a reboot may map to LUN-Y after a reboot.

SUMMARY OF THE INVENTION

A method and apparatus for generating a persistent path to a SCSI device for a host is described. In an embodiment, a SCSI device is queried for path information related thereto, and if path information is returned, a SCSI command requesting identifier data is issued to the SCSI device. The identifier data is used to determine a unique identifier (UID), from which is generated a UID-based device file for the SCSI device that is independent from the path information.

BRIEF DESCRIPTION OF THE DRAWINGS

The present invention will become more fully understood from the detailed description given here and below and the accompanying drawings which are given by way of illustration only, and thus are not limitative of the present invention, and wherein:

FIG. 1 illustrates a general interaction of device files within a UNIX or Linux subsystem;

FIG. 2 illustrates the relationship between device files, drivers and devices in a Linux SCSI I/O Subsystem;

DETAILED DESCRIPTION

In accordance with the method and apparatus of the invention, device file persistence across rebooting is attained by creating unique logical unit identifier-based (UID-based) device file names for all LUNs (e.g., identifiers of logical units) seen by a Linux host. A UID, also known as a RUID, provides a unique logical unit ID that is independent of the logical unit h, b, t, l path mapping. UID-based device file names remain the same for a SCSI device or LUN even after a reboot of the Linux OS. If UID-based device file names are utilized when mounting file systems on SCSI devices on Linux host computers, device file persistence is insured across all reboots of the OS.

Figure 3:
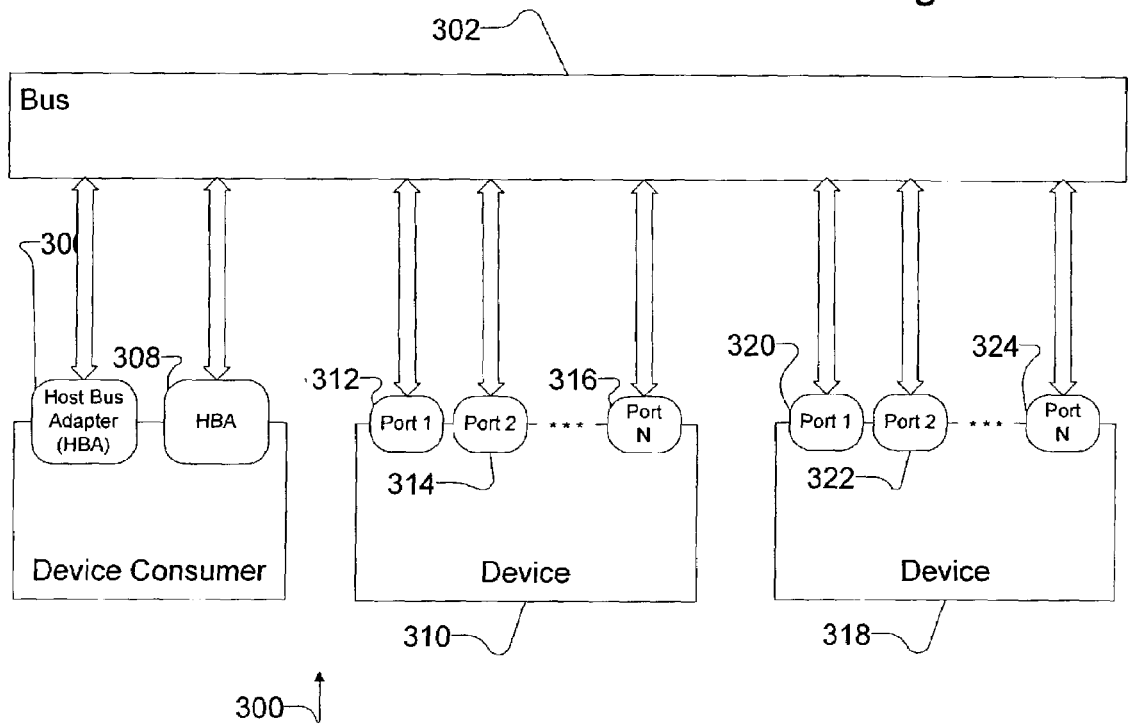
FIG. 3 depicts a hardware block diagram of a system 300 according to an embodiment of the invention.

FIG. 3 depicts a hardware block diagram of a system 300 according to an embodiment of the invention. The system 300 may include a bus (e.g., SCSI, fibre channel, etc.) 302 to which are connected a consumer of device services (hereafter a device consumer) 304, a device 310 and a device 318. Device consumer 304 may also be referred to as a host or a SCSI initiator device and devices 310 and 318 may be referred to as SCSI target devices.

The device consumer 304 includes host bus adapters (HBAs) 306 and 308 that permit the device consumer 304 to connect to and interact with the bus 302. The device 310 has port 1 (312), port 2 (314), . . . port N (316). Device 318 has port 1 (320), port 2 (322), . . . port N (324). For simplicity of disclosure, only two devices 310 and 318 and two HBA's 306 and 308 have been depicted, but fewer or greater devices could be attached to the bus depending upon the particular circumstances of a situation.

Figure 4:
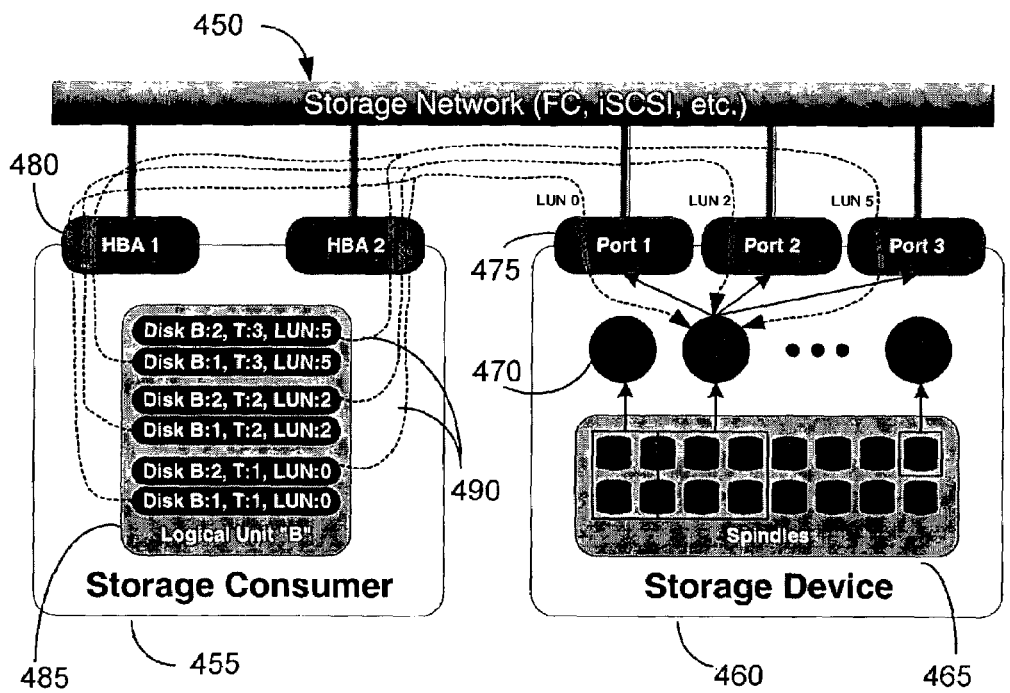
FIG. 4 depicts a hardware block diagram corresponding to a particular type of system 300.

FIG. 4 depicts a hardware block diagram corresponding to a particular type of system 300, namely a storage area system or storage area network (SAN) 450. SAN 450 consists of a single storage consumer 455 (e.g., a host bus, a host computer, server, etc.) and a storage device 460 (e.g., RAID array, etc.); however, the present invention is envisioned for storage networks of any size and any number of storage consumers/storage devices. Storage consumer 455 may represent a SCSI initiator device, and storage device 460 may represent a SCSI target device. The devices described in SAN 450 may also be embodied as a SCSI bus or fibre channel (FC) fabric (e.g. frame switching network or arbitrated loop), for example.

Storage device 460 may contain a number of disk spindles 465 (or some type of storage medium such as flash RAM, tape, etc.) that the storage device 460 uses to persistently store data for consumers of the storage device (e.g., storage consumer 455). Storage device 460 publish internal storage to consumers by creating logical units 470 of storage using various methods that match with the storage consumer 455's needs. For example, logical units 470 may be stripped across multiple spindles 465 to improve throughput, logical units 470 may be mirrored across multiple spindles 465 for data resiliency.

FIG. 4 shows three such logical units 470, labeled LU "A", "B", and "C" that are constructed from some number of disk spindles 465. One or more storage consumers 455 may access a particular LU by communicating requests to a port 475 on storage device 460 and tagging the request with a port relative address, this is the logical unit number or LUN. In FIG. 4, LU B may be mapped out of three different ports 475 (e.g., SCSI target ports or target ports) by the storage device 460.

If consumer 455 wants to use LU B (e.g., to access data contained in the logical unit which ultimately resides on one or more of the spindles 465) consumer 455 may access LU B by sending requests to Port 1 tagged with LUN 0, to Port 2 using LUN 2, or to Port 3 using LUN 5. This is an example of a storage device providing multiple paths to the same LU, which is commonly done for fault tolerance and/or improved bandwidth. Consumers of storage (hosts) can also have multiple connections into a SAN for the same reasons. Accordingly, in FIG. 4, storage consumer 455 represents a single host that has two connections to SAN 450, via Host Bus Adapters 480 (HBA "1" & HBA "2"; these are synonymous to SCSI initiator ports).

The dotted lines in FIG. 4 represent the various SCSI paths 490 from the host consumer 455 through SAN 450 to LU B. From the perspective of the host consumer 455, each SCSI path 490 appears to consumer 455 as an unrelated block of storage. Internally, the consumer 455's operating system (OS) will create named objects to represent the blocks of storage the OS discovered (represented as "Disk B:# T:# LUN:#", analogous to the h,b,t,l path). In FIG. 4, the "host" (consumer 455) has six paths to LU B and has created six different OS objects that ultimately point to the same logical unit of storage. Block 485 denotes the fact that the contained named objects are all related to the exact same logical unit, in this example LU B; however storage consumer 455, without additional logic, cannot nominally discover this relationship. This can result in multiple instances of the same file system being mounted on the Linux host, each with its own local independent cache. This cache can easily result in file system and/or data corruption because of the uncoordinated access to the logical unit. The method and apparatus of the invention, in creating UID-based device file names, overcomes this problem.

Referring again to FIG. 4, the LUNs on a storage device 460 could be swapped, e.g., LUN 2 could become LUN 5 and vice versa, since the LUN numbering can change during storage device reconfiguration. Additionally, LUN-to-port mappings could change, i.e., LUN 2 could change from being mapped to Port 2 to port 3 in FIG. 4. Further, if additional HBA cards are to a Linux Host, one result is many more multiple redundant paths to a SCSI device. As will be described below, the creation of UID-based device file names, solves these problems as well, since a UID uniquely determines the LUN, irrespective of the multiple paths to the device.

The method and apparatus of the present invention utilize input output control calls (IOCTLs) as a way to issue device-specific commands. The form of the call may be Result=ioctl(fd, command, arg);

where fd identifies an open file descriptor; command specifies the operation to be performed; and arg provides any other information that may be required. The parameter arg is often the address of a control block in memory, so it may be possible to provide arbitrary amounts of data as parameters to an ioctl operation. The interpretation of a command is left entirely up to the device driver.

The following ioctl( )s can be called from any ULD (sd,st, sr,sg): (1)SCSI_IOCTL_GET_IDLUN—an ioctl which takes a pointer to a "struct scsi_idlun" object as its third argument, and is populated with scsi channel, device id and lun data for the given device; (2) SCSI_IOCTL_GET_BUS_NUMBER: this ioctl takes an 'int *' as its third argument and places the bus number associated with a device in the associated "int". Bus numbers are allocated sequentially from 0 by the mid-level SCI layer and are roughly one bus number per physical SCSI host adapter in the machine; and (3) SCSI_IOCTL_SEND_COMMAND: a command that is forwarded onto the mid-level SCI driver for processing, and is an alternate way to send a SCSI command. The third argument may point to a structure which as described below.

```
struct sdata {
    unsigned int inlen;      [i] Length of data to be written to device
    unsigned int outlen;     [i] Length of data to be read from device
    unsigned char cmd[x];    [i] SCSI command (6 <= x <= 12).
                             [o] Data read from device starts here.
                             [o] On error, sense buffer starts here.
    unsigned char wdata[y];  [i] Data written to device starts here.
};
```

Figure 5:
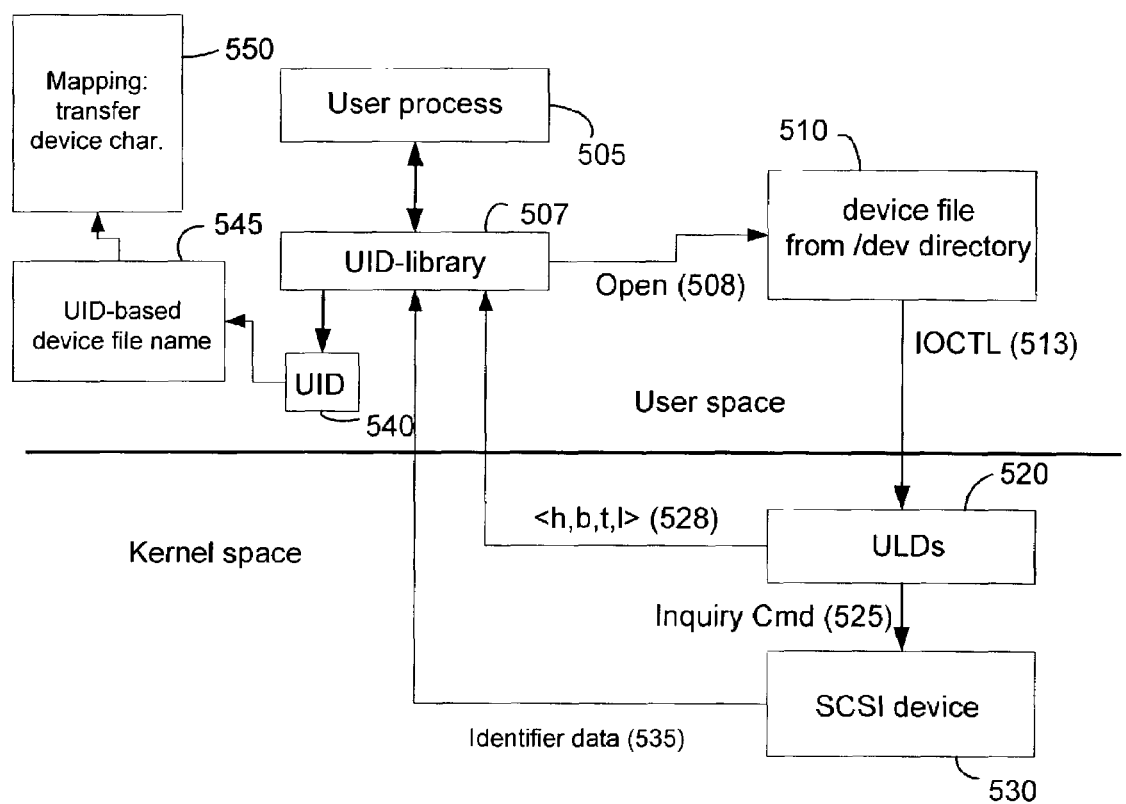
FIG. 5 illustrates an embodiment of the method in accordance with an exemplary embodiment of the invention.

FIG. 5 is a data flow diagram describing an exemplary embodiment of the method in accordance with the invention. The description below describes how to generate a UID based device file having the same characteristics as a sg device file. The same approach may be used to generate UID-based device files for sd, sr and st drivers that have the same characteristics as a corresponding sd, sr and st device file.

In the method, a user process 505 calls a UID library 507 in user space. The UID library 507 resides in the user space and is accessible by user programs or processes in the user space. The user process 505 opens (508) all the sg device files (i.e. non-UID-based device files) 510 and issues an IOCTL SCSI_IOCTL_GET_IDLUN to the sg device driver 520 so that a path information of a physical device 530, e.g., the scsi host, bus, target id and lun or (h,b,t,l address) referenced by the device file 510 is determined. All sg files are opened and the sg driver is used because every SCSI device has a generic device file associated with it. In other words a SCSI disk has an associated sd device file and sg device file, a SCSI tape has an associated st device file and sg device file, etc.

The device file 510 is opened and the response to the IOCTL call returns to the UID library 507 the h, b, t, l address (e.g., path) 528 for a particular physical device 530. The physical device 530 may be a SCSI device for example, and may be a logical unit (represented by a LUN) on a SCSI device. The h,b,t,l represents the path as seen by a Linux host (from the viewpoint of an ULD 520 on the host) to a particular LUN on device 530 (e.g., disk driver (sd) to a disk LUN, tape driver (st) to a tape LUN, etc.).

The user process 505, having received an h,b,t,l address 528 of a given LUN (e.g., of a logical unit at physical device 530), calls the UID library 507 to issue a SCSI command 525, such as a SCSI inquiry command, via the ULD 520 to the physical device 530. In this exemplary embodiment, UID library 507 calls the sg driver with the IOCTL SCSI_IOCTL_SEND_COMMAND, along with the SCSI inquiry command as a parameter The SCSI inquiry command contains data requesting that the device forward identifier data 535 back to the UID library. For example, the SCSI inquiry command could contain a particular bit (e.g., a one-bit enable vital product bit (EVPB)) that requests a Device Identification Vital Product Data Page (VPD 83h) from the device 530. If the VPD 83h page is not supported, the inquiry command may include an EVPB bit to request a unit serial number VPD page (VPD 80h). Further, the inquiry command may query for a standard inquiry page payload. The standard inquiry page payload may include data related to vendor identification, product identification, product revision level of the logical unit (LUN) mapping to the h,b,t,l address at device 530. In other words, the data returned is dependent on what data is being queried for in the SCSI command.

The UID library 507 receives the identifying data 535 in order to compute or generate a unique identifier (UID) 540 in the user space. The creation of a UID 540 may be accomplished as described in co-pending U.S. patent application Ser. No. 10/260,415 to Erickson et al., entitled METHOD AND ARRANGEMENT FOR GENERATING UNIQUE IDENTIFIERS FOR SCSI LOGICAL UNITS, filed on Oct. 1, 2002, the contents of which are hereby incorporated by reference in their entirety. For example, the UID library 507 may concatenate a product serial number field and one or more of the vendor identification, product identification, product revision level, and peripheral device type fields from the standard inquiry page to identifier data found and cached in the VPD 83h page and/or VPD 80h page payload. The resultant identifier for the logical unit (LUN) is a globally unique identifier (UID) that is independent of vendor, product, path and logical unit type (e.g. random access magnetic disk, sequential access magnetic tape, etc.).

The UID library 507 utilizes the generated UID 540 in order to create a UID-based file name 545. The UID-based file name 545 is independent of the h,b,t,l path, and provides a persistent identifier for a device 530 (such as a LUN (logical unit)) across reboots of the Linux OS on the host (e.g., host computer, such as the storage consumer 455 of FIG. 4).

Each UID-based device file name contains the UID 540 and a path number. In order to determine the path number, UIDs for all device files in the /dev directory (in this example, the /dev/sg directory) are computed. By maintaining a hash map (e.g., in memory mapping) of sg device file names to UID, the number of sg device files that map to the same ID can be determined (i.e., they can be enumerated), and hence the path number of the UID-based device file name, can be determined. The "key" for the hash map is based on the UID. it is possible to determine multiple device files (e.g., /dev/sg0, /dev/sg1, etc.) pertaining to a single UID. The multiple non-UID-based device files that map to a given UID can be enumerated. Then the path number for a given non-UID-based device file, among the multiple instances thereof mapping to a given UID, that corresponds to the given UID-based device file becomes the path number thereof. Once all device files sharing the same UID have been identified, multiple UID-based device files having the same characteristics of the standard device files, but different path numbers, may be generated. For device files (i.e., non-UID-based device files) sharing the same UID (i.e., assuming sg0 and sg1 map to the same UID), the path number is numbered from 0 to the total number of device files sharing the UID minus 1. In the case of generating UID-based file name for disk devices, dummy partitions (16 partitions between the numbers of 0-15) are created for each path number.

The above exemplary method has been described in terms of using an sg device file to open an sg driver in order to get SCSI device path information. Of course, the above method may be repeated instead by opening a dev/sd device file or dev/st device file to generate UIDs for the sd driver and st driver, respectively. The above is repeated for all device files in the /dev/sd and /dev/st directories respectively, and UID-based device files are built with the UIDs and determined path numbers.

UID-Based Device File Name Conventions

For disk LUNs seen by a disk driver, UID-based device files are created in a format <COMPRESSED_UID>-<PATH_NO>-<PARTITION_NO> under a "/dev/trdisk" directory. This is a filter specific directory that is created and maintained in user space and may be accessed by a user application (such as a user mode daemon 118). The COMPRESSED_UID is the UID created for the logical unit (LUN). UIDs sometimes can be very lengthy, so as to exceed a maximum file name length limit. In order to obtain a shorter UID, the UID may be compressed using a well know run length limited (RLL) algorithm. PATH_NO differentiates between multiple paths to the same logical unit, and PARTITION_NO is a specific partition on the disk.

For generic LUNs seen by a generic driver, which includes disk LUNs and tape LUNs, a "/dev/trgen" directory that is created and maintained in user space and may be accessed by a user application, and which contains UID-based device files in the format <COMPRESSED_UID>-<PATH_NO>, where COMPRESSED_UID is the UID-based device name and PATH_NO differentiates between multiple paths to the same logical unit. There is no partition number for generic device listings because the concept of partitions does not exist for generic LUNs. When dealing with disks, generic device files always refer to the entire disk.

For tape LUNs seen by a tape driver, a "/dev/trtape" directory is created and maintained in user space and may be accessed by a user application. The /dev/trtape directory contains UID-based device files in the format [n]<COMPRESSED_UID>-<PATH_NO>[-<DEVICE_CHARACTERISTICS>] where n is present for tape LUNs with no-rewind functionality and n is absent for tape LUNs with rewind capability. COMPRESSED_UID is the UID-based device name, PATH_NO differentiates between multiple paths to the same logical unit, and DEVICE_CHARACTERISTICS pertains to characteristics of the tape LUN.

UID-based disk device files created for disk LUNs seen by the disk driver (sd) should have the same characteristics as the standard /dev/sd[a-z] and /dev/sd[a-z][a-z] disk driver device files. The UID-based generic device files created for generic LUNs seen by the generic driver should have the same characteristics as the standard /dev/sg [0-255] generic driver device files. The UID-based tape device files created for tape LUNs seen by the tape driver should have the same characteristics as the standard /dev/st [0-32] and /dev/nst [0-32] tape driver device files. Accordingly, as shown in FIG. 5, in this example the UID-based device file 545, which is a UID-based disk device file named /dev/trdisk/<COMPRESSED_UID>-<PATH_NO>-<PARTITION_NO>), must be mapped (at 550) to the device file 510 (i.e., a non-UID-based device file, e.g., a standard disk driver device file named "/dev/sda").

The UID-based device file 550 and device file 510 have the same major number (e.g., major number 8 from Table 1) and the same minor number (e.g., 0) and point to the same device 530 via device driver 520. The mapping function essentially consists of transferring all device characteristics from the /dev/sda device file 510 to the UID-based device file /dev/trdisk/<COMPRESSED_UID>-<PATH_NO>-<PARTITION_NO>. This is effected by using what is called a "stat ( )" system call. A stat ( )system call is a standard function that is supplied by the Linux OS that provides information about any file. The characteristics returned by the stat ( ) call are summarized below. These are copied directly into the UID-based device file:

```
struct stat {
           dev_t         st_dev;      /* device */
           ino_t         st_ino;      /* inode */
           mode_t        st_mode;     /* protection */
           nlink_t       st_nlink;    /* number of hard links
*/
           uid_t         st_uid;      /* user ID of owner */
           gid_t         st_gid;      /* group ID of owner */
           dev_t         st_rdev;     /* device type (if inode
                                         device) */
           off_t         st_size;     /* total size, in bytes
*/
           unsigned long st_blksize;  /* blocksize for
                                         filesystem I/O */
           unsigned long st_blocks;   /* number of blocks
                                         allocated */
           time_t        st_atime;    /* time of last access
*/
           time_t        st_mtime;    /* time of last
                                         modification */
           time_t        st_ctime;    /* time of last change
*/ }
```

Referring above, all or part of the characteristics are transferred. Exemplary characteristics transferred include st_dev, which contains the device 510's major and minor number, st_mode, which contains the file's access permissions, st_uid and st_gid, which describe file ownership, st_rdev, which determine the type of special device file it is (character vs. block), etc. Accordingly, with the characteristics from /dev/sda having been transferred, opening the UID-based device file is essentially the same as opening the standard device file pointing to the device 530, via the corresponding ULD (e.g., sd driver) 520.

With a UID-based device file name having been created, and the characteristics of the standard device file having been transferred, a particular partition may be mounted. The commands below enable the mounting of partitions 1, 2 and 3 of a disk LUN with the UID-based disk device driver file name (e.g., in the <COMPRESSED_UID>-<PATH_NO>-<PARTITION_NO> format):

mount/dev/trdisk/931E132CR30008R700010201002R 50002037112DB3-0-1/mnt/test1;

mount/dev/trdisk/931E132CR30008R700010201002R 50002037112DB3-0-2/mnt/test2;

mount/dev/trdisk/931E132CR30008R700010201002R 50002037112DB3-0-3/mnt/test3;

The command to mount file systems is called a mount command, which includes the UID-based device file name, as well as a mount point (a mounting point—mnt). Shown here are the three partitions (e.g., file systems) being mounted to mounting points test1, test2 and test3 on the system. Accordingly, to mount file systems automatically at start-up, the UID-based device file names are added to the fstab file. As shown in the following example, the three partitions of the LUN with the UID-based disk driver device file name above have been added (shown in bold) to an exemplary fstab file.

/etc/fstab file

[root@sb-iso6 trdisk]# cat/etc/fstab

LABEL=/ /ext2 defaults 1 1

LABEL=/boot/boot ext2 defaults 1 2

/dev/fd0/mnt/floppy auto noauto,owner 0 0 none/proc proc defaults 0 0 none/dev/pts devpts gid=5,mode=620 0 0

/dev/sda6 swap swap defaults 0 0

/dev/cdrom/mnt/cdrom iso9660 noauto,owner,kudzu,ro 0 0

/dev/trdisk/931E132CR30008R700010201002R 50002037112DB3-0-1/mnt/test1 ext2 rw 0 0

/dev/trdisk/931E132CR30008R700010201002R 50002037112 DB3-0-2/mnt/testi2 ext2 rw 0 0

/dev/trdisk/931E132CR30008R700010201002R 50002037112 DB3-0-3/mnt/test3 ext2 rw 0 0

/dev/sdd/mnt/test4 ext2 rw 0 0

/dev/sdd1/mnt/test5 ext2 rw 0 0

The following UID-based device file names, each file name having the same UID, illustrates multiple path numbers concept (and hence multiple device files in the /dev, that are mapped to same UID). The device file names represent SCSI disk devices and are in the <COMPRESSED_UID>-<PATH_NO><PARTITION_NO> format. The different path numbers refer to two different /dev/sd files that are mapped to the same UID:

/dev/trdisk/931E132CR30008R700010201002R 50002037112DB3-0-2

/dev/trdisk/931E132CR30008R700010201002R 50002037112DB3-1-2

Therefore, the method and apparatus of the present invention solves the problem of device file persistence across reboots by creating UID-based device file names for all the LUNs seen by the Linux Host. UIDs provide a unique logical unit ID that is independent of the logical unit's controller (host), bus, target, and LUN mapping. UID-based device file names remain the same for a LUN even after a reboot of the Linux host. Moreover, if UID-based device file names are used when mounting LUNs on Linux hosts, device file persistence is ensured across reboots.

The invention having been thus described the invention may be varied in many ways. For example, the method and apparatus of the present invention may be implemented in storage area networks (SANs) that use a Fibre Channel (FC) medium for the underlying network transport and, at the upper driver layer, move data to and from disks with serial SCSI protocol, as described in the current draft SCSI Primary Commands-3 (SPC-3) document.

Additionally, the functional blocks in FIGS. 1-5 may be implemented in hardware and/or software. The hardware/software implementation may include a combination of processors, application service providers, application specific integrated circuits (ASICs) and/or articles of manufacture. The articles of manufacture may further include storage media and executable computer program. The executable computer program may include the instructions to perform the described operations. For example, the computer program may be a product that includes a computer-readable medium having computer program logic stored thereon for enabling a processor of the product to generate a persistent path identifier for a device. The computer executable programs may also be provided as part of externally supplied propagated signals. Such variations are not to be regarded as a departure from the spirit and scope of the invention, and all such modifications as would be obvious to one skilled in the art are intended to be included within the scope of the following claims.

What is claimed:

1. A method for generating a persistent path identifier of a SCSI device for a host, comprising the steps of:
   opening a non-UID-based device file for the SCSI device;
   obtaining identifier data regarding the SCSI device;
   determining a unique identifier (UID) based on the identifier data; and
   generating a UID-based device file according to the UID and the non-UID-based device file.

2. The method of claim 1, wherein the step of obtaining includes:
   querying the SCSI device for path information related thereto; and
   issuing a SCSI command to the SCSI device requesting identifier data from the SCSI device, if path information to the SCSI device is returned from the querying step.

3. The method of claim 2, wherein the path information includes a <host, bus, target, LUN> address of a particular path from the host to the SCSI device.

4. The method of claim 2, wherein the issuing step includes issuing one or more SCSI inquiry commands.

5. The method of claim 2, wherein the querying step further comprises:
   issuing a command, via the non-UID-based device file, requesting path information of the SCSI device.

6. The method of claim 5, further comprising:
   mapping characteristics of said non-UID-based device file to said UID-based device file.

7. The method of claim 6, wherein said mapping step further comprises
   transferring at least one or more of a major number, minor number, access permissions, file ownership data and device file type of said opened device file to said UID-based device file.

8. The method of claim 1, wherein the UID-based device file is independent from the path information.

9. The method of claim 1, further comprising:
   creating a name for the UID-based device file founded upon the UID.

10. The method of claim 9, wherein the step of creating includes:
    compressing the UID.

11. The method of claim 9, wherein:
    the non-UID-based device file is a given one of a plurality of such device files that map to the UID;
    the method further includes enumerating the plurality of non-UID-based device files mapping to the UID; and
    wherein the name for the given UID-based device file also is founded upon the enumeration assigned to the given non-UID-based device file.

12. The method of claim 1, wherein at least some characteristics of the SCSI device stored in the non-UID-based device file are copied into the UID-based device file.

13. The method of claim 12, wherein the UID-based device file enables mounting of one or more file systems on the host so that device file persistence is ensured across reboots of an operating system being run on the host.

14. The method of claim 12, wherein a UID-based device file name remains the same for the SCSI device, even after a reboot of an operating system being run by the host.

15. An apparatus for generating a persistent path identifier of a SCSI device for a host, comprising:
    means for opening a non-UID-based device file for the SCSI device;
    means for obtaining identifier data regarding the SCSI device;
    means for determining a unique identifier (UID) based on the identifier data; and
    means for generating a UID-based device file.

16. The apparatus of claim 15, wherein the means for obtaining includes:
    means for querying the SCSI device for path information related thereto; and
    means for issuing a SCSI command to the SCSI device requesting identifier data from the SCSI device, if path information to the SCSI device is returned from the query.

17. The apparatus of claim 16, wherein the path information is path information having a <host, bus, target, LUN> encoded-address of a particular path from the host to the SCSI device.

18. The apparatus of claim 16, wherein said means for querying further is operative for
    issuing a command, via the non-UID-based device file, requesting path information of the SCSI device.

19. The apparatus of claim 15, further comprising:
    means for mapping characteristics of said non-UID-based device file to said UID-based device file.

20. The apparatus of claim 19, wherein said means for mapping transfers at least one or more of a major number, minor number, access permissions, file ownership data and device file type of said opened device file to said UID-based device file.

21. The apparatus of claim 15, further comprising
    means for storing the UID-based device file.

22. The apparatus of claim 21, wherein the means for storing further includes a plurality of directories containing device file names for different types of SCSI devices.

23. The apparatus of claim 22,
    wherein the SCSI device is a SCSI disk device, and
    wherein one of the directories stores generated device files for disk drivers, the device file name being in a format <COMPRESSED_UID>-<PATH_NO>-<PARTI- TION_NO>, where COMPRESSED_UID represents a UID-based SCSI device name, PATH_NO differentiates between multiple paths to the SCSI disk device, and PARTITION_NO is a specific partition on the disk.

24. The apparatus of claim 22,
wherein the SCSI device is a SCSI tape device, and
wherein one of the directories stores generated device files for tape drivers, the device file name being in a format [n]<COMPRESSED_UID>-<PATH_NO>-<SCSI DEVICE_CHARACTERISTICS>, where COMPRESSED_UID represents a UID-based SCSI device name, PATH_NO differentiates between multiple paths to the SCSI tape device, and SCSI DEVICE_CHARACTERISTICS pertains to characteristics of a tape logical unit number (LUN).

25. The apparatus of claim 22, wherein one of the directories stores generated device files for generic drivers, the device file name being in a format <COMPRESSED_UID>-<PATH_NO>, where COMPRESSED_UID represents a UID-based SCSI device name, and PATH_NO differentiates between multiple paths to the SCSI device.

26. The apparatus of claim 15, wherein the SCSI device is a logical unit of a SCSI device.

27. The apparatus of claim 15, wherein the UID-based device file enables mounting of one or more file systems on the host so that device file persistence is ensured across reboots of an operating system being run on the host.

28. The apparatus of claim 15, wherein a UID-based device file name remains the same for the SCSI device, even after a reboot of an operating system being run by the host.

29. The apparatus of claim 15, wherein the UID-based device file is independent from the path information.

30. The apparatus of claim 15, further comprising:
means for creating a name for the UID-based device file founded upon the UID.

31. The apparatus of claim 30, wherein the means for creating further is operative for compressing the UID.

32. The apparatus of claim 30, wherein:
the non-UID-based device file is a given one of a plurality of such device files that map to the UID; and
the means for creating further is operative
for enumerating the plurality of non-UID-based device files mapping to the UID, and
for founding the name for the given UID-based device file also upon the enumeration assigned to the given non-UID-based device file.

33. The apparatus of claim 15, wherein at least some characteristics of the SCSI device stored in the non-UID-based device file are copied into the UID-based device file.

34. A computer program product, the computer program product comprising a computer-readable medium having computer program logic stored thereon for enabling a processor of the product to generate a persistent path identifier of one or more of SCSI devices for a host, the computer program logic causing the processor to:
open a non-UID-based device file for the SCSI device;
obtain identifier data regarding the SCSI device;
determine a unique identifier (UID) based on the identifier data; and
generate a UID-based device file according to the UID and the non-UID-based device file.

35. The computer program product of claim 34, wherein the computer program logic further causes the processor to:
query a SCSI device for path information related thereto; and
issue a SCSI command to the SCSI device requesting identifier data from the SCSI device, if path information to the SCSI device is returned from the querying step.

36. The computer program product of claim 34, wherein the UID-based device file enables mounting of one or more file systems on the host so that device file persistence is ensured across reboots of an operating system being run on the host.

37. The computer program product of claim 34, wherein a UID-based device file name remains the same for the SCSI device, even after a reboot of an operating system being run by the host.

38. A method of generating a persistent path identifier, for a system having a first plurality of SCSI devices to which a second plurality of non-UID-based device files correspond, respectively, included within the second plurality there being a third plurality of non-UID-based device files corresponding to a given one of the first plurality of SCSI devices, the method comprising the steps of:
computing unique identifiers (UIDs) for the second plurality of non-UID-based device files;
enumerating which among the plurality of non-UID-based device files map to the same UID, respectively;
generating, relative to a given one of the third plurality of non-UID-based device files, a UID-based device file; and
creating a name for the UID-based file founded upon the corresponding UID and upon the enumeration assigned to the given non-UID-based device file.

39. The method of claim 38, wherein the step of creating includes:
compressing the UID.

* * * * *